| United States Patent [19] | [11] Patent Number: 4,702,924 |
| Owens et al. | [45] Date of Patent: Oct. 27, 1987 |

[54] DRIED MEAT CONTAINING COATING

[75] Inventors: Thomas M. Owens, Cahokia, Ill.; Thomas J. Wagner, Hillsboro; William C. Mrazek, Jr., Mehlville, both of Mo.

[73] Assignee: Ralston Purina Company, St. Louis, Mo.

[21] Appl. No.: 502,865

[22] Filed: Jun. 9, 1983

[51] Int. Cl.⁴ .......................... A23K 1/08; A23K 1/10
[52] U.S. Cl. ..................................... 426/92; 426/623; 426/630; 426/646; 426/656; 426/805
[58] Field of Search .................. 426/89, 92, 641, 646, 426/583, 623, 630, 656, 807, 805

[56] References Cited

U.S. PATENT DOCUMENTS

| 3,348,954 | 10/1967 | Green | 99/140 |
| 3,615,647 | 10/1971 | Kassens | 99/2 R |
| 3,808,340 | 4/1974 | Palmer | 426/92 |
| 3,808,341 | 4/1974 | Rogney et al. | 426/92 |
| 4,029,821 | 6/1977 | Munro | 426/92 |

Primary Examiner—R. B. Penland
Attorney, Agent, or Firm—Virgil B. Hill

[57] ABSTRACT

An animal food composition of improved palatability is disclosed having a dried meat containing coating which comprises meat, vegetable protein isolate and whey. The palatability enhancing material is applied to a nutritionally balanced animal food product as a dusting in order to enhance the palatability of the pet food product.

16 Claims, No Drawings

DRIED MEAT CONTAINING COATING

BACKGROUND OF THE INVENTION

This invention relates to an animal food of improved palatability and a meat containing palatability enhancing material applied to the surfaces of the food product.

Dried pet food products are widely marketed for pets such as cats and dogs. Generally, dried pet food products sold commercially have a relatively low moisture content of less than about 12% by weight, and provide excellent nutrition for animals because of a lower moisture content which permits a higher degree of nutritional balancing of ingredients. Extrusion cooking processes for the production of dried pet foods have been a significant factor in the growth of this market because of the better cooking achieved with this type of process as well as better mixing of ingredients and the desirable texture achieved with a puffed or expanded product. Dry products produced by this type of process are well accepted by the animal but are significantly lower in palatability than canned or high moisture products which typically consist entirely of meat with a moisture content of about 50% by weight.

Another means of overcoming the lower palatability of dry pet foods is to increase the moisture content to a point where the pet will readily accept it but to a point which is below the level of moisture at which canning or sterilization of the product is required for maximum bacteriological stability. This has been achieved by the development of intermediate moisture pet foods where the moisture content is controlled to between about 15 and 45% by weight. The water activity of the product can be controlled or various preservatives can be included to provide bacteriological and mycotic stability. While the intermediate moisture products are relatively palatable, they are still not on a par with high moisture products and usually suffer from the deficiency that the preservative system which is needed for this type of product lowers palatability below that for the same product without the preservative. Furthermore, in these and dry products, ingredient formulation becomes exceptionally critical and cannot be altered by using ingredients of equal nutritive value unless one can be sure the alternative ingredient does not depress or diminish palatability. The formulation of these type of products therefore becomes complex and each ingredient used must be evaluated for its relative effect on palatability of the product. This, of course, reduces the flexibility in formulation that a pet food manufacturer would like to have. Therefore, even though dry and intermediate moisture products have been extremely successful and convenient to use by the pet owner, a need has continually existed for additives or other ingredients which can be applied to the food product in order to increase the palatability of the product without reducing or altering the nutritive properties.

A variety of materials and additives have been proposed for use as palatability enhancers for pet foods. For example, U.S. Pat. No. 3,679,429 describes the use of various flavor enhancing acids to boost the palatability of cat foods. U.S. Pat. No. 3,930,031 describes a synergistically effective flavor enhancing coating with a critically defined mixture of phosphoric and citric acid to improve the palatability of dry and intermediate moisture pet foods for cats. More recently, various types of meat containing coatings have been employed to improve the palatability of dry or intermediate moisture pet foods. U.S. Pat. No. 3,808,340 describes a pet food product comprising a core material composed of various proteinaceous and farinaceous ingredients having a cover layer of a substantial thickness which comprises animal tissue. The animal tissue is applied as a paste to provide a continuous coating on the product and the entire product is then dried.

U.S. Pat. No. 3,348,954 further describes a dried meat containing material which can be applied to dog foods to improve the palatability thereof. This dried material is formed by taking raw meat, grinding and mixing with water followed by cooking of the meat to make a roast meat type flavor. This roasted meat material is then liquified, homogenized, and spray dried and is thereby suitable for addition to dog food products to improve the palatability thereof. U.S. Pat. No. 4,229,485 describes a dried cereal based pet food composed of farinaceous and proteinaceous materials which is encapsulated within a glazed coating composed of liver and farinaceous materials. The coating comprises a level of greater than 50% by weight of liver and is applied to the core material in a moist state followed by baking of the coated core to form a continuous glaze of the coating on the pet food product.

In spite of the development of the above coatings which contain meat as an essential ingredient, a need still exists for a coating containing meat which is highly palatable to pets. A need also exists for a meat containing palatability enhancer which is formed in such a manner that it can be easily applied or dusted on most conventional or intermediate moisture pet foods and added at a relatively low level such that it does not alter the appearance of the pet food product yet provides a significant boost in palatability.

It is therefore an object of the present invention to provide an animal food product of improved palatability.

It is a further object of the present invention to provide a meat containing coating for improving the palatability of pet foods that can be easily prepared and applied to the pet food product.

These and other objects are achieved pursuant to the present invention.

SUMMARY OF THE INVENTION

An animal food product of improved palatability is provided comprising a nutritionally balanced mixture of proteinaceous-farinaceous ingredients and a dusting of a dried palatability enhancing material comprising meat, a vegetable protein isolate and whey. The dried palatability enhancing material is prepared from a unique combination of ingredients which provide a pet food product which is significantly more palatable.

The present means for enhancing the palatability of an animal food composition is applicable to a wide range of commercial pet food products but is specifically applicable to pet food products having a moisture content of less than about 45% by weight, typically between 10-45% by weight, therefore encompassing dry and intermediate moisture pet foods. As has been previously noted, this type of product has a greater need for palatability enhancing additive than does a high moisture canned pet food or animal food which can depend on a high moisture level for a high degree of acceptability. The dried palatability enhancing composition of the present invention is unique in that it contains meat and can be dusted on the pet food product at a relatively low level to significantly improve palatability without the need for a meat coating of a substantial thickness or the addition of wet meat containing a slurry to the pet food which requires baking or subsequent drying of the product.

DESCRIPTION OF THE PREFERRED EMBODIMENTS

The animal food compositions and method of enhancing the palatability thereof to which the present invention is intended to relate generally comprises a nutritionally balanced mixture of proteinaceous and farinaceous ingredients wherein the resulting product has a moisture content of less than about 45% by weight. It may therefore be said that the present invention is intended to apply to dry or intermediate moisture pet foods, as those terms are known to a person skilled in the art of pet food formulation and manufacturing. The pet food compositions or the animal food compositions of the present invention to which the palatability enhancing material is added is not intended to be restricted by any specific listing of ingredients since these will be entirely dependent on the nutritional balance of the ration desired as well as availability of the ingredient to the pet food manufacturer. Aside from nutritional balancing additives such as vitamins, minerals or other additives such as preservatives and emulsifiers and the like, which are included in these products commercially available and nutritionally balanced animal food compositions such as pet foods for the most part, consists of ingredients which may either be termed substantially proteinaceous or alternatively as substantially farinaceous. Although the following brief description should not be considered as limiting the present invention, a proteinaceous ingredient can be defined as any material having a protein content of at least about 15% by weight whereas a farinaceous material has a protein content substantially below this with a major fraction of starch or carbohydrate containing materials. Typical examples of proteinaceous materials which are employed in commercially nutritionally balanced pet foods are vegetable protein meals such as soybean, cottonseed, peanut, animal protein such as casein and albumen and of course, meat tissue including fresh meat as well as rendered or dried meal such as fish meal, poultry meal, meat meal, meat and bone meal and the like. Other types of proteinaceous materials include microbial proteins such as yeast and other materials such as wheat or corn gluten.

Examples of typical farinaceous materials are grains such as corn, milo, alfalfa, wheat and various other grains which have relatively low protein contents. Numerous other materials can be added to the animal food composition for purposes of nutritional balance or for other purposes which do not necessarily fall into either category set forth above and the present invention is not intended to be limited by a specific combination or listing of ingredients which can be employed to formulate a nutritionally balanced animal food composition.

The palatability enhancing material of the present invention is prepared from a meat source wherein natural meats such as poultry, fish, animal meats and meat by-products having the requisite quality ingredient, cost and palatability are selected. The fresh meat or meat by-products to be employed in the present invention may be selected from a wide range of components including beef, chicken, fish, liver, tuna or pork. It will be understood that other fresh meat materials may be equally employed and the selection of these will be well within the knowledge of one skilled in the art and formulation of animal food products. In some cases, it may be desirable to include an edible fat with the meat such as an animal or vegetable fat depending on the fat content of the meat employed.

The meat which is selected for production of the palatability enhancing material of the present invention is generally maintained in either a chilled or frozen condition at a temperature ranging from $-20°$ F. to $+40°$ F. It is important that the meat be retained at a temperature prior to slurry formation of below $+40°$ F. to avoid significant cooking or denaturization of the protein prior to formation of the dried palatability enhancing material of the present invention. The frozen or semi-frozen meat product is initially sliced in any suitable fashion and then passed through a meat grinder equipped with a 3/16 inch grinding plate in order to reduce the meat into pieces of a substantially uniform size. The exact size described above is preferred for purposes of the present invention but is not critical to its practice and satisfactory results may be obtained by grinding the meat to particle sizes either larger or smaller than this as the case may be.

An aqueous slurry is then formed preferably by preheating an aqueous medium to a temperature of about 110° F. in order to sufficiently disperse or solubilize added carbohydrate materials. The specific temperature is not critical to the present invention. Following preheating of the aqueous medium, a carbohydrate material such as a dried or liquid whey material is dissolved or dispersed in the aqueous medium in an amount of between about 20 to 35% by weight of the aqueous medium. A variety of whey sources are suitable for use in the present invention including liquid whey, sweet dairy whey, or condensed sweet dairy whey. The aqueous medium containing the added whey is agitated or otherwise mixed for a sufficient period of time such that substantially complete dissolution or dispersion of the whey or carbohydrate material in the aqueous medium takes place.

Following dispersion of the whey in the aqueous medium, the ground meat particles are added to the slurry, preferably in an amount sufficient to provide a meat solids level in the aqueous medium or slurry between about 1 to 22% by weight of the slurry. During the addition of the meat particles, the slurry is maintained at a temperature of about 110° F. and is agitated or dispersed for a sufficient period of time such that a relatively uniform mixture results.

Following the addition of the ground meat particles to the slurry, an emulsifying amount of a vegetable isolate is added to the slurry in order to provide a relatively stable emulsion between the aqueous medium, added meat and inherent fat contained in the meat particles. A soy protein isolate is preferred for purposes of the present invention and this can be selected from a wide variety of soy isolates having a protein content greater than about 90% by weight and suitable for use in edible food products. Typical isolates of the type suitable for use in the present invention and methods for their production are described in U.S. Pat. No. 3,642,490. While the exact amount of vegetable protein isolate to be added is not critical to the practice of the present invention, a preferred amount of isolate is between about 2.5 to 10% by weight of the slurry.

The slurry containing the above ingredients is then homogenized or ground, as for example, through a colloid mill to sufficiently reduce the particle size of the slurry to a spray driable form. The exact manner of homogenization or grinding is not critical to the practice of the present invention and it will be readily apparent that this is solely for the purposes of reducing excessive or large particles to a level such that the resulting slurry may be easily and readily dried as for example in a spray drying process. If homogenization is carried out, it is preferred to carry out homogenization in a two stage homogenizer with typical pressures being about 2000 psi in the first stage and 500 psi in the second stage.

Following homogenization or grinding of the slurry, the slurry is then dewatered by drying and preferably by a flash drying process such as spray drying to result in a uniform, dried product. The exact manner of drying or spray drying the product of the present invention is not critical to the practice of the same provided that the spray drying is not carried out at temperatures such that the palatability of the material is adversely effected. Typical exhaust temperatures to be employed for spray drying in the present invention include temperatures of below about 325° F. and typically in the range of 150° to 225° F.

The spray dried palatability enhancing material of the present invention therefore comprises a meat level of about 2.5 to 41% by weight, a vegetable protein isolate level of about 6 to 23% by weight and a whey level of about 50 to 88% by weight. If fat has been added either prior to slurry formation or subsequent to spray drying, it will be present in an amount of between about 1–15% by weight of the material. This specific level of components is not intended to limit the present invention since they may be altered as desired depending on the degree of palatability response expected, as for example, by taking the dried coating and further diluting the same with a palatable carrier such as a dried whey material to further reduce the meat level to between about 2.5 to 16% by weight on a dry basis. The palatability enhancing material of the present invention is then applied to a nutritionally balanced animal food product by dusting thereon at a level effective to improve the palatability of the product and preferably is dusted on in an amount such that a meat level of at least about 0.06% by weight of said product is provided in the dusting. A more preferred level of the palatability enhancing material is to dust it on the product such that a meat level in the dusting of between about 0.06 to 2.3% by weight of the product is provided. The use of the dried palatability enhancing material and its dusting on an edible animal food product significantly improves the palatability thereof by the presence of this unique combination of ingredients to result in a material which has stable characteristics upon storage yet does not have a significant level of fresh animal tissue for purposes of enhancing the palatability of dry pet foods. Furthermore, the uniform, dried and flowable nature of this material permits easy and continuous application of the material to a dried pet food product when these products are produced commercially. It is therefore apparent that a significant improvement has been achieved in the application of meat type coatings to dried pet foods for purposes of enhancing the palatability thereof. The following examples represent specific embodiments of the present invention.

EXAMPLE 1

Frozen, mechanically deboned, raw chicken meat is sawed into strips and ground through a meat grinder equipped with a 3/16 inch grinding plate. The chicken was maintained at a temperature of below 40° F. during grinding.

An aqueous slurry was prepared from the following ingredients:

| Ingredient | % By Weight of Slurry |
| --- | --- |
| Ground Chicken Meat | 4.0 |
| Soy Protein Isolate | 4.0 |
| Dried Dairy Whey | 32.0 |
| Water | 60.0 |

The whey was dissolved in the water which has been preheated to 110° F. followed by mixing the solution for 5 minutes. The isolated soy protein was added and mixed for an additional 10 minutes while the water temperature was maintained at 110° F.

The ground, semi-frozen chicken meat is added to the slurry, maintained at a temperature of 110° F. and mixed for 10 minutes. The slurry was then passed through a mill to reduce the particle size of the slurry to a substantially uniform size. The slurry was homogenized in a two stage homogenizer with the first stage being operated at 2000 psi and the second stage being operated at 500 psi. After homogenization, the slurry was heated by steam addition to 150° F. and held for 30 minutes. The slurry was heated by steam injection to a temperature of 185° F. and held at that temperature for 70 seconds. The slurry is cooled to 150° F. and spray dried using an exhaust temperature of 210° F. The dried, powdered meat containing coating was a free flowing powder.

The dried coating was dusted on a commercially available dry cat food product sold under the tradename of Meow Mix ® by the Ralston Purina Company, St. Louis, Mo. at a level of 1.0 and 3.0% by weight. These two products were each evaluated against a control product which was identical except that no dried meat coating was applied. The products were fed dry to a group of 18 cats for a period of 4 days to evaluate the palatability response when fed on a dry basis. The results of this testing are contained in Table 1.

TABLE 1

| Sample | Dusting % | Total Food Consumed (g) | No. of Cats Preferred | No. of Cats No Preference | Statistical Significance |
| --- | --- | --- | --- | --- | --- |
| Control | 0 | 596 | 0 | 1 | P < .01 |
| Sample #1 | 3 | 4327 | 17 | | |
| Control | 0 | 463 | 0 | 2 | P < .01 |
| Sample #2 | 3 | 3665 | 16 | | |

It may be seen that the palatability of the dry cat food was significantly improved by the addition of the dried meat containing product of the present invention at each level of application.

EXAMPLE 2

20 pounds each of three different dried meat products were prepared as described in Example 1, except that in one sample, tuna red meat was substituted for the chicken meat of Example 1, and in a second sample, fresh frozen liver was substituted for the chicken meat of Example 1. The third sample was prepared as described in Example 1. The 3 dried meat products were free flowing powders and were each dusted on a quantity of a commercially available dry cat food product sold under the tradename of Meow Mix ® by Ralston Purina Company, St. Louis, Mo. The products were dusted on the cat food product at ranging levels and the dusted products were each palatability tested against a control product which was identical except that no dried meat product was dusted on. The products were fed dry to a group of 18 cats for a period of 4 days to evaluate the palatability response. The results of this testing including the levels of dried meat product evaluated are set forth in Tables 2, 3 and 4.

TABLE 2

| | | Chicken Coating | | |
|---|---|---|---|---|
| Sample | Dusting % | Total Food Consumed (g) | No. of Cats Preferred | No. of Cats No Preference | Statistical Significance |
| Control | 0 | 2292 | 1 | 3 | P < .01 |
| Sample #1 | 0.5 | 3187 | 14 | | |
| Control | 0 | 2238 | 5 | 3 | No Significance |
| Sample #2 | 1.0 | 2905 | 10 | | |
| Control | 0 | 1988 | 3 | 0 | P < .01 |
| Sample #3 | 2.0 | 3313 | 15 | | |
| Control | 0 | 1618 | 2 | 0 | P < .01 |
| Sample #4 | 3.0 | 3897 | 16 | | |

It may be seen that the palatability of the dried cat food with the chicken meat containing product of the present invention dusted on was significantly improved at each level of application as compared to a control, although the level of application used in Sample #3 showed only a numerical rather than a statistical preference.

TABLE 3

| | | Tuna Coating | | |
|---|---|---|---|---|
| Sample | Dusting % | Total Food Consumed (g) | No. of Cats Preferred | No. of Cats No Preference | Statistical Significance |
| Control | 0 | 1912 | 4 | 3 | P < .01 |
| Sample #1 | 0.5 | 2651 | 11 | | |
| Control | 0 | 2051 | 4 | 3 | N.S. |
| Sample #2 | 1.0 | 2556 | 11 | | |
| Control | 0 | 2048 | 5 | 3 | N.S. |
| Sample #3 | 2.0 | 2895 | 10 | | |
| Control | 0 | 1680 | 2 | 2 | P < .02 |
| Sample #4 | 3.0 | 2861 | 14 | | |

It may be seen that the palatability of the dried cat food with the tuna containing product of the present invention dusted on was improved at each level of application as compared to a control although the level of application used in Samples #2 and 3 showing a numerical rather than a statistically significant preference.

TABLE 4

| | | Liver Coating | | |
|---|---|---|---|---|
| Sample | Dusting % | Total Food Consumed (g) | No. of Cats Preferred | No. of Cats No Preference | Statistical Significance |
| Control | 0 | 1587 | 3 | 1 | P < .01 |
| Sample #1 | 0.5 | 3194 | 14 | | |
| Control | 0 | 1160 | 3 | 0 | P < .01 |
| Sample #2 | 1.0 | 3557 | 15 | | |

TABLE 4-continued

| | | Liver Coating | | |
|---|---|---|---|---|
| Sample | Dusting % | Total Food Consumed (g) | No. of Cats Preferred | No. of Cats No Preference | Statistical Significance |
| Control | 0 | 806 | 3 | 1 | P < .01 |
| Sample #3 | 2.0 | 3505 | 14 | | |

It may be seen that the palatability of the dry cat food was significantly improved by the dusting on the dried meat containing product of the present invention at each level of addition.

EXAMPLE 3

Frozen, mechanically deboned chicken meat is sawed into strips and ground through a meat grinder equipped with a 3/16 inch grinding plate. The chicken was maintained at a temperature of below 40° F. during grinding.

The ground chicken meat was used to prepare two different aqueous slurries having the following ingredients.

| Ingredient | Slurry A % By Weight of Slurry | Slurry B % By Weight of Slurry |
|---|---|---|
| Ground Chicken Meat | 4.0 | 4.0 |
| Soy Protein Isolate | 4.0 | 4.52 |
| Dried Dairy Whey | 32.0 | 28.33 |
| Animal Fat | — | 3.15 |
| Water | 60.0 | 60.0 |

The slurries were prepared as described in Example 1 with the animal fat being added to the slurry following dispersion of the whey. The dried product from each slurry was obtained as described in Example 1. The dried product from each slurry was dusted on a quanitity of a commercially available dry cat food sold under the tradename of Meow Mix ® by Ralston Purina Company, St. Louis, Mo. The dried meat products were dusted on the cat food product at varying levels of application and the dusted products were each palatability tested against a control product which was identical except that no dried meat product was dusted on. The products were fed dry to a group of 18 cats for a period of 4 days to evaluate the palatability response. The results of this testing, including the level of dried meat product are set forth in Table 5.

TABLE 5

| Sample | % Level of Dusting | Total Food Consumed (g) | No. of Cats Preferred | No. of Cats No Preference | Statistical Significance |
|---|---|---|---|---|---|
| Control | 0 | 596 | 0 | 1 | P < .01 |
| Sample #1 (Slurry A) | 3.0 | 4327 | 17 | | |
| Control | 0 | 463 | 0 | 2 | P < .01 |
| Sample #2 (Slurry B) | 3.0 | 3665 | 10 | | |

It may be seen that the palatability of the dried cat food was significantly improved with the dried meat products prepared from both slurries.

EXAMPLE 4

The dried chicken coating of Example 2 was dusted on a quantity of commercially available dry dog food sold under the tradename Beef Puppy Chow ® by Ralston Purina Company, St. Louis, Mo. at a level of 1.0% by weight of the product. The dusted product was identified as Sample #1. The dried liver coating of Example 2 was dusted on the above dry dog food at a level of 1.0% by weight of the product. The product dusted with the liver coating was identified as Sample #2. A third product was dusted with a combination of the dried liver coating of Example 2 at a level of 0.5% by weight of the product and the dried chicken coating of Example 2 at a level of 0.5% by weight of the product. These were palatability tested against a control product which was identical except that no dried meat product was dusted on. The products were fed dry to a group of 20 dogs for a period of 4 days to evaluate the palatability response. The results of this testing are set forth in Table 6 below.

TABLE 6

| Sample | % Dusting | Total Food Consumed (g) | No. of Cats Preferred | No. of Cats No Preference | Statistical Significance |
|---|---|---|---|---|---|
| Control | 0 | 31.8 | 8 | 1 | N.S. |
| Sample #1 | 1.0 | 41.8 | 11 | | |
| Control | 0 | 20.1 | 0 | 0 | P < .01 |
| Sample #2 | 1.0 | 56.9 | 20 | | |
| Control | 0 | 35.3 | 4 | 0 | P < .01 |
| Sample #3 | 1.0 | 54.7 | 16 | | |

It may be seen that in two of the three cases, the palatability of the dried dog food was significantly improved.

Statistical evaluation in the above examples was performed in accordance with the Wilcoxon Signed Rank Test.* This test is believed to provide a reliable statistical determination of whether there is, in fact, a preference for either ration in this type of palatability experiment wherein the test ration and control ration are simultaneously presented to each dog on a free choice basis.

*The Wilxocon Signed Rank Test was proposed by F. Wilcoxon in Biometrics Bulletin, 1:80 (1945). Explanations and applications of this test may be found in: G. W. Snedecor, W. G. Cochran. Statistical Methods, 6th ed. pp. 128–130. The Iowa State University Press, Ames, Iowa (1967); Experimental Statistics, pp. 16-1 to 16-3. United States Department of Commerce, National Bureau of Standards Handbook 91 (1963); R. G. D. Steel, J. H. Torrie, Principles and Procedures of Statistics, pp. 402–403. McGraw-Hill Book Company, Inc., New York (1960); C. I. Bliss, Statistics in Biology, pp. 225–228. McGraw-Hill Book Company, Inc., New York (1967).

The above Examples represent specific but non limiting embodiments of the present invention and it is to be understood that reasonable modifications, variations or substitutions may be made without departing from the spirit or scope of the present invention.

What is claimed is:

1. An animal food product of improved palatability comprising: a nutritionally balanced mixture of proteinaceous and farinaceous ingredients with a dusting, at a level effective to improve palatability of the product, of a dried palatability enhancing material comprising meat in an amount of about 25 to 41% by weight of said material, a vegetable protein isolate in an amount of about 6 to 23% by weight of said material, and whey in an amount of about 50 to 88% by weight of said material.

2. The animal food product of claim 1 wherein the product has a moisture level of less than about 45% by weight.

3. The animal food product of claim 2 wherein the product has a moisture level of between about 10–45% by weight.

4. The animal food product of claim 1 wherein the level of said dusting provides a meat level of at least about 0.06% by weight of the product.

5. The animal food product of claim 4 wherein the level of said dusting provides a meat level of between about 0.06 to 2.3% by weight of the product.

6. The process for improving the palatability of an animal food product comprising:
    (a) forming an aqueous slurry of 1 to 22% by weight of fresh meat material, 2.5 to 10% by weight of a vegetable protein isolate and 20 to 35% by weight of whey;
    (b) dewatering said slurry to provide a dried palatability enhancing material, and
    (c) dusting said dried material on an animal food product in an amount effective to enhance the palatability thereof.

7. The process of claim 6 wherein said slurry is dewatered by spray drying.

8. The process of claim 6 wherein said animal food product has a moisture level less than about 45% by weight.

9. The process of claim 8 wherein said animal food product has a moisture level of between about 10–45% by weight.

10. The process of claim 6 wherein said frest meat is at a temperature below about 40° F. before said slurry is formed.

11. The process of claim 6 wherein said slurry is homogenized before dewatering of said slurry.

12. The process of claim 6 wherein said slurry is formed by dissolution of the whey in an aqueous medium followed by the addition of the meat and isolate.

13. The process of claim 6 wherein said meat is ground into pieces of a substantially uniform size prior to addition to said slurry.

14. The process of claim 6 wherein said slurry is maintained at a temperaure of about 110° F. prior to homogenization thereof.

15. The process of claim 6 wherein the level of said dusting provides a meat level of at least about 0.06% by weight of the product.

16. The process of claim 15 wherein the level of said dusting provides a meat level of between about 0.06 to 2.3% by weight of the product.

* * * * *